United States Patent [19]

Condon

[11] 4,234,050
[45] Nov. 18, 1980

[54] SNOW BOB WITH DETACHABLE FUEL TANK

[75] Inventor: Richard W. Condon, Frankfort, Ill.

[73] Assignee: Roper Corporation, Kankakee, Ill.

[21] Appl. No.: 956,660

[22] Filed: Nov. 1, 1978

[51] Int. Cl.³ ..................... B60K 15/02; B62M 27/02
[52] U.S. Cl. ................................. 180/190; 280/5 R; 280/5 H
[58] Field of Search ...................... 280/5 H, 5 R, 5 A; 180/9.24, 184, 185, 190, 208, 219, 222, 223, 225, 191

[56] References Cited

U.S. PATENT DOCUMENTS

| | | | |
|---|---|---|---|
| 2,354,438 | 7/1944 | Craig | 280/5 R |
| 3,650,342 | 3/1972 | Pushnig | 180/9.24 A |
| 3,845,834 | 11/1974 | Sheppard | 280/5 H |
| 3,872,944 | 3/1975 | Shapiro | 280/278 X |

Primary Examiner—John A. Pekar
Attorney, Agent, or Firm—Fitch, Even, Tabin, Flannery & Welsh

[57] ABSTRACT

A power driven snow bob is provided with a detachable fuel tank which can be readily attached and reattached in a rapid and expedient manner in a cold outdoor environment. To assist in retaining the fuel tank, it is formed with a groove on its under surface which mates with a cross bar portion of the frame and with a sliding interlock portion at one end for sliding in an interlocking relationship with a retaining means on the frame. At the other end of the fuel tank, a quick connect and disconnect means comprising a push-pull retaining pin is inserted through aligned apertures in a fuel tank and a grommet on the fuel tank. The fuel line is detachably connected to a fitting having a shut-off valve.

9 Claims, 10 Drawing Figures

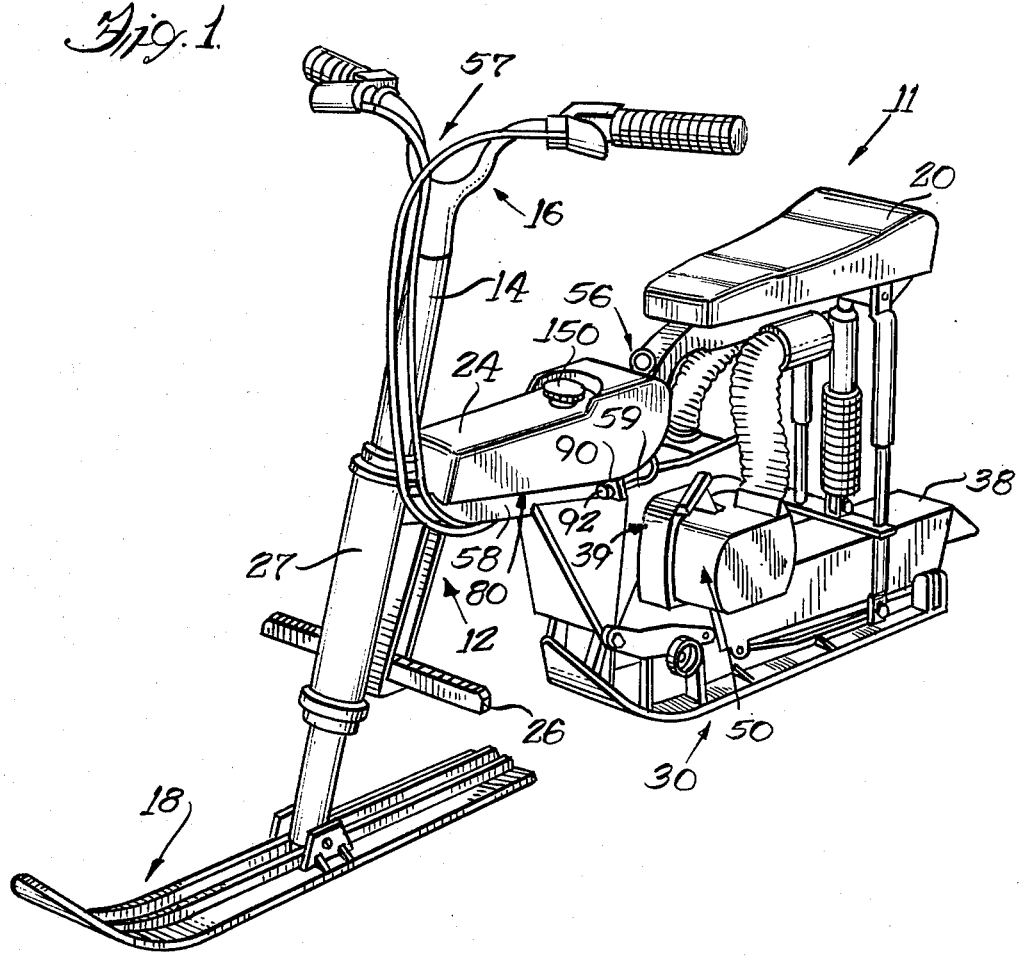

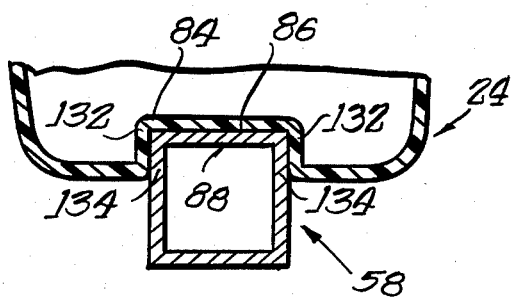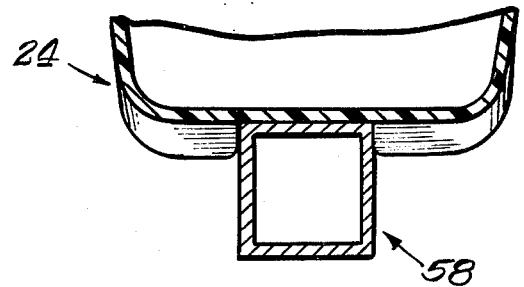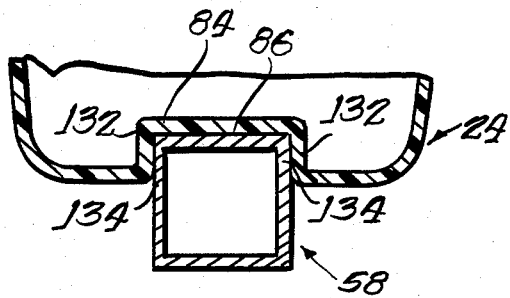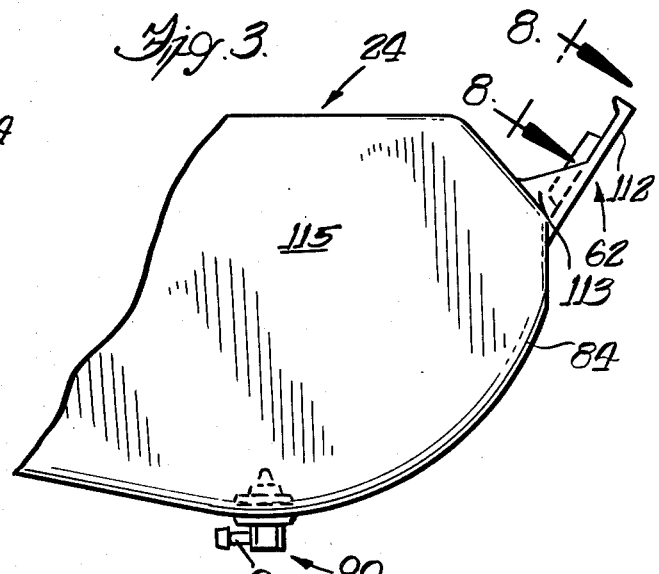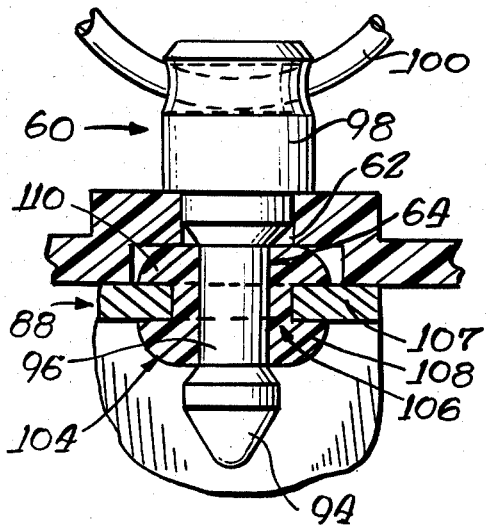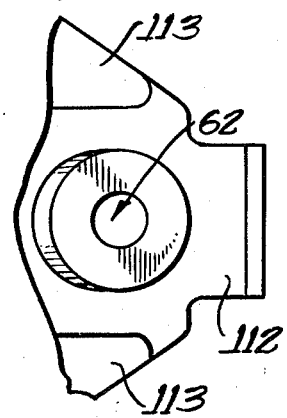

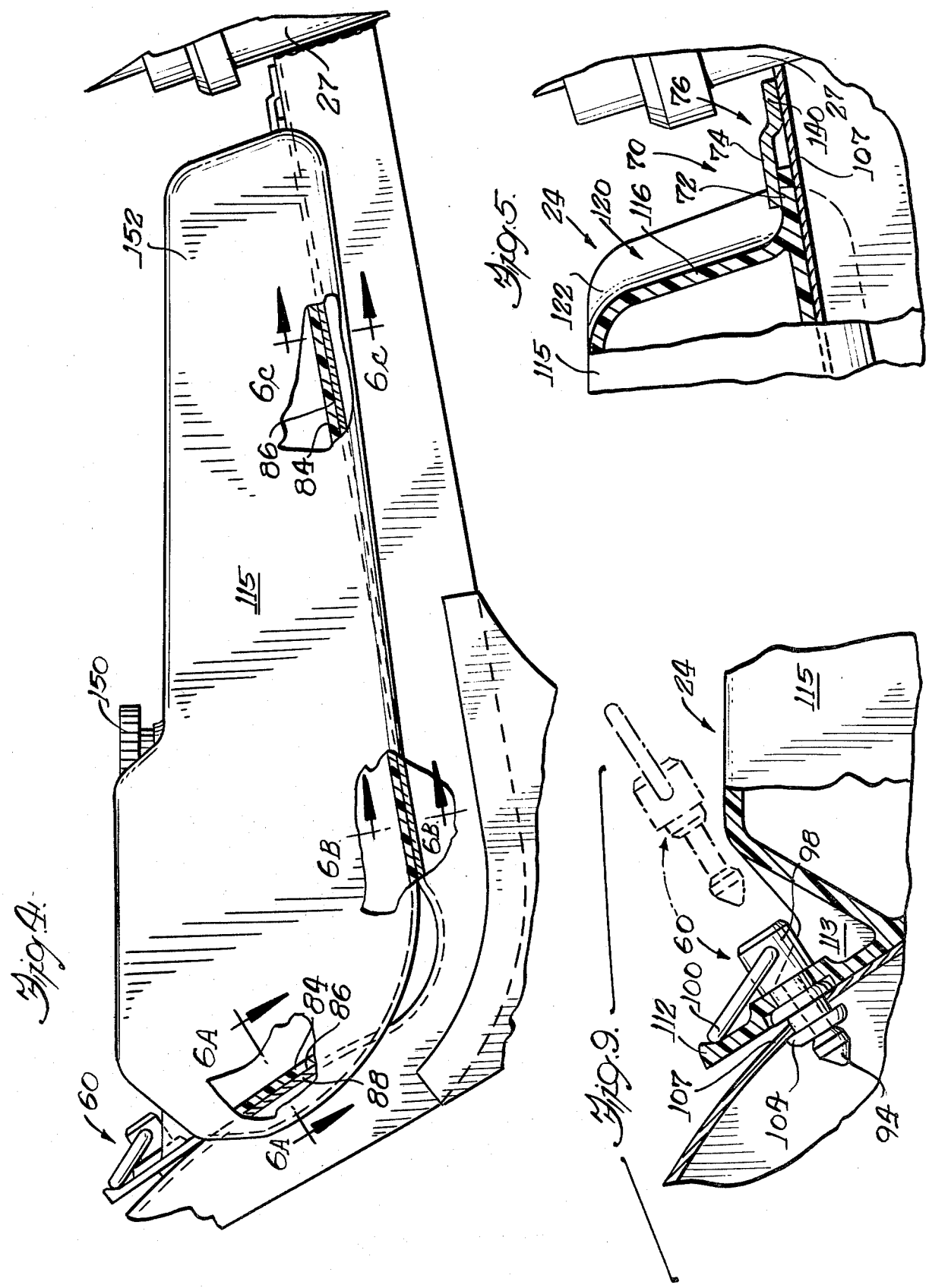

SNOW BOB WITH DETACHABLE FUEL TANK

This invention relates to a power driven snow bob, and more particularly to such a snow bob having at least one detachable component so it can be easily reduced to a compact and safe form for transportation or storage.

The present invention is particularly directed to a power driven snow bob having a fuel tank, such as for example a gasoline tank which can be readily disconnected from the snow bob frame and from a fuel line leading to the gasoline engine for separate storage apart from the frame. Snow bobs of this general kind are particularly useful if they can be disassembled for transportation to remote sites by other modes of transportation, such as automobiles, airplanes, etc., and then reassembled in a rapid and expedient manner. In the illustrated embodiment of the invention described herein, the front ski of the snow bob is also releasably connected to the steering post for disconnection so that the front ski may be stored or transported separately from the remainder of the ski bob.

Heretofore, ski bobs, such as shown in published German patent applications Nos. 1,816,274 and 2,003,326, appear to have had their fuel tanks fixedly attached to the ski bob's frame. It is known to have a detachable gas tank as part of knockdown motorcycle construction as is disclosed in U.S. Pat. No. 3,872,944. However, to detach this gas tank, the motorcycle seat must be first detached; and, moreover, the complex manners of attachment of the motorcycle parts involves tools and time consuming operations not suitable for a cold outdoor environment as usually will be encountered with a ski bob. When the general public is to assemble or disassemble a gas tank in cold outdoor environment, the manner of connection and disconnection should be simple and straight forward and require a minimum of tools or fastener parts which can be readily lost in the snow.

Furthermore, it will be appreciated that a ski bob travels over rough terrain and is subjected to shocks and impacts as well as twisting turns. Moreover, complete spills of the rider will not be uncommon. To withstand such forces as may be applied in various directions and with various degrees of impact, the fuel tank must be rugged in itself and have good connections to the frame. Working at cross odds to this requirement is the desirable objective that the fuel tank be assembled without the aid of cumbersome tools and parts that the general public will find offensive, particularly when dealing with cold metal parts in an outdoor winter environment.

Accordingly, a general object of the present invention is to provide a ski bob with a readily attachable and detachable fuel tank.

These and other objects and advantages of the present invention will become apparent in the following detailed description taken in connection with the accompanying drawings in which:

FIG. 1 is a perspective view of a power driven snow bob embodying the present invention;

FIG. 2 is an exploded fragmentary view of the detachable fuel tank of FIG. 1;

FIG. 3 is a partial side view of the rear of the fuel tank of FIG. 2;

FIG. 4 is a side view of the fuel tank of FIG. 1;

FIG. 5 is an enlarged partial, cross-sectional view of a forward interlock of the fuel tank and cross bar of FIG. 4;

FIGS. 6a–c are partial cross-sectional views of the fuel tank and cross bar of FIG. 4 along the lines A, B and C, respectively;

FIG. 7 is an enlarged partial cross-sectional view of a plunger pin of FIG. 4;

FIG. 8 is a fragmentary view of a flange of the fuel tank of FIG. 3 seen along the line 8—8; and FIG. 9 illustrates the insertion of the plunger pin of FIG. 4 to secure rear of the fuel tank to the cross bar.

As shown in the drawings for purposes of illustration, the invention is embodied in a motorized snow vehicle 11 of the snow bob kind having an upstanding main frame 12 in the forward end of which is journaled an upright steering post 14 carrying a handlebar 16 at its upper end. A front turning ski 18 is attached to the lower end of the steering post which is turned by the operator to steer the ski bob. The rider sits on a seat 20 at the rear portion of the frame with his hands on the handlebars 16 and with his legs astride a central cross portion of the frame carrying a fuel tank 24 with his feet resting on a transversely extending footrest bar 26 disposed near the lower end of a cylindrical frame tube 27 in which is journaled the steering post 14. The vehicle is propelled by a rear power ski 30 which includes an endless driving track having a lower run at which the track is in engagement with the snow and moving rearwardly and an upper return run in which the track is moving forwardly across the top of the power ski 30 and within a protective housing 38 (FIG. 1). An internal combustion motor 50 is disposed beneath the seat 20 and is supported by the power ski 30 near its front at a location over the power track and is connected by a transmission means 39 to drive the endless propulsion track. Suitable cable controls 57 extend from the handlebar 16 to the motor 50 allowing the operator to control the acceleration and braking of the motor and thereby the propulsion track 32. A fuel line 59 extends from the fuel tank 24 to the motor 50.

Insofar as known, ski bobs, such as exemplified in published German patent applications, Nos. 1,816,274 and 2,003,326, have had fuel tanks carried by the snow bob but the fuel tanks appear to be mounted in a fixed manner. In other fields such as motorcycles, the fuel tank may be detached as part of disassembly of the entire motorcycle but such as undertaking obviously requires tools, time and manipulations not suitable for cold outdoor situations in which a snow bob will be used.

In accordance with the present invention, the gas tank 24 is readily assembly and disassembled from the ski bob by merely manipulating a quick connect and disconnect means 56 at one end of the fuel tank and removing the tank from a cross bar 58 of the frame 12. In this instance, the quick connect and disconnect means comprises a plunger pin 60 which is pushed into or pulled from a pair of aligned apertures 62 and 64 in the fuel tank and cross bar, respectively. Herein, the gas tank 24 is then slid from a sliding interlock means 70 associated with the frame 12. The interlock means 70 comprises a front lip or flange 72 on the gas tank which slides beneath a retaining lip 74 of a retaining clip means 76 fastened to the frame 12. Such simple connections are possible and still effective to hold the gas tank onto the frame as during spills of the ski bob because the gas tank is configured to matingly engage cross bar to resist transverse and rearward movement relative to the frame. The preferred configuration comprises a longitudinally extending channel groove 82 on the underside of gas tank which receives therein an upper portion of the frame cross bar, the groove including a rear groove section 86 in a rear gas tank wall 84 receiving therein an upwardly and rearwardly extending section 88 of the cross bar 58. The gas line 59 may be readily disconnected from a fitting 90 secured to a bottom wall 80 for the gas tank and provided with a valve 92 which is closed before disconnecting the gas line 59 from the fitting. The assembly operation is merely the reverse of the disassembly operation, above described.

Referring now in greater detail to the individual elements of the invention, the preferred plunger pin 60 is formed with an enlarged distal end 94 on a cylindrical shank 96 of small diameter. An enlarged outer head 98 on the shank carries a pull ring 100 whereby the operator may grasp the ring and pull the plunger pin upwardly and outwardly through the aligned apertures 62 and 64. Herein, the aperture 64 is a circular opening in the center of a resilient, rubber-like grommet 104 which is fixed in a hole 106 in the frame section 88, which is a tubular steel member. The grommet aperture 64 is sized slightly smaller than the distal end 94 of the plunger pin 60 so that the distal end may be pushed therethrough but it will not fall or travel outwardly unless pulled therefrom deliberately. The grommet is secured to the frame by pushing an enlarged inner annular flange 108 through the hole 106 in the upper wall 107 of the cross bar 58 whereupon the inner flange 108 expands beneath the cross bar wall 107 while an outer annular flange 110 is abutting the outer side of the cross bar. The grommet has a narrowed center section disposed within the hole 106.

As best seen in FIG. 3, an aperture 62 is formed in a flange or lip 112 molded integrally with the gas tank body and projecting upwardly and outwardly from the rear wall 84 of the gas tank. The lip 112 is superimposed on the grommet with its centrally located aperture 62 axially aligned with the aperture 64 in the grommet. The aperture 62 is sufficiently large to pass the distal end 94 of the plunger but not the outer head 98 which abuts the outer side of the lip and thereby holds the lip against upward or outerward movement relative to the frame section 88. The lip 112 has a width equal to about the width of the cross bar and is within a projected well formed by integral end walls 113 (FIG. 3) at the upper rearward end of the gas tank.

The lip 72 at the front end of the gas tank 24 is a flat, integrally molded projecting portion of the gas tank body 115 and projects forwardly from a front wall 116 of the gas tank body. As best seen in FIG. 5, this front lip 72 is adapted to slide along and to lie flat against the frame cross wall 107 when being inserted beneath the retaining clip flange 74. Herein, the front lip 72 is about as wide as the cross bar and is formed at the bottom of a front channel 120 formed at the front gas tank wall 116. The clip flange 74 has a width to fit into this front channel 120 between the channels upwardly extending side walls 122. The sides of the retaining clip thus may abut these channel side walls 122 if there is any lateral sliding or twisting of the gas tank on the cross bar.

The groove 82 in the underside of the gas tank body also is curved to matingly engage a curved bent portion 130 of the cross bar 58, the bent portion 130 joining the generally horizontal front section of the cross bar to the upwardly angled rear section 88. Herein, the width of the top side of the cross bar is about 1.5 inches and the groove 82 is only slightly wider in width so that the opposite, interiorly facing, groove side walls 132 will slide along and abut the vertical sides 134 of the cross bar 58. Thus, there is provided engagement between the cross bar 58 and the gas tank along the longitudinal extent of the gas tank to resist laterally directed forces. The depth of overlap between the channel side walls 132 and the vertical sides 134 of the cross bar is about 0.75 inch, in this instance.

The retaining clip 76 for receiving the front lip 72 of the gas tank 24 is a single piece of metal having a flat, front end 140 secured by welding to the cross bar wall 107 at a location adjacent the column tube 27 in which is journaled the steering post 14. The retaining flange 74 is integral with and bent upwardly from the clip's front end 140, and the retaining flange 74 is generally parallel to the front end 140 and parallel to the cross bar wall 107. The retaining flange is spaced above cross bar wall 107 by a distance slightly greater than the thickness of the gas tank front lip 72. Thus the sliding of the front lip into this space beneath the flange 74 provides the sliding interlocking means 70.

Herein, the gas tank 24 is a molded plastic body 115 having a hollow interior with an upper opening covered by a gap cap 150 which is projected within a semicircular well wall 151 in the top of the gas tank body. The gas tank has a larger rear portion positioned over the curved frame section 130 and a more narrowed tapered front portion 152. The capacity and shape of the tank 24 may be varied; herein the gas tank holds about one gallon of gasoline.

The gasoline fitting 90, which is secured to the lower side of the gas tank, is a commercially available kind of fitting and has the valve 92 therein. The valve is opened or closed by turning an exterior valve handle. The end of the gas line 59 merely slips on or off an end of the fitting for connection or disconnection thereto. With the valve 92 closed and the gas cap on, the gas tank 24 may be stowed or transported without concern over spilling of gasoline therefrom.

What is claimed is:

1. In a power driven snow bob having a motor drivingly connected to an endless propulsion track on a rear power ski and with a frame carrying a seat for an operator and adapted to be steered by a steering post having a front ski attached to the lower end thereof, the improvement comprising a detachable fuel tank secured to said frame, and rear power ski being pivotally mounted to said frame and said motor being mounted on said rear power ski, and a fuel line extending from said engine to said fuel tank, said fuel tank being mounted on said frame in an exposed position for direct removal therefrom without necessitating removal of other components, said gas tank having surfaces thereon in mating engagement with portions of said frame to assist in retention of the fuel tank on said frame, means for disconnecting said fuel tank from said fuel line, and quick connect and disconnect means releasably connecting said fuel tank to said frame so that the fuel tank may be removed or replaced without the use of tools.

2. A snow bob in accordance with claim 1 in which said surfaces on said fuel tank in mating engagement with the frame comprise a groove for receiving therein one side of a frame portion for holding the tank against lateral movement.

3. A snow bob in accordance with claim 1 in which said quick connect and disconnect means comprises a plunger pin inserted through an aperture in said frame and/or a portion of said fuel tank.

4. A snow bob in accordance with claim 1 in which a sliding interlock means is provided between said frame and said gas tank with a portion of said gas tank sliding into an interlocked portion on said frame.

5. A snow bob in accordance with claim 4 in which said sliding interlock means comprises a lip on said gas tank and a retaining clip secured to said frame, a flange on said retaining clip defining a slot into which is slid said lip to slidingly interlock the gas tank to the frame.

6. In a power driven snow bob having a motor drivingly connected to an endless propulsion track carried by a rear power ski and with a frame carrying a seat at its rear end and having a cross frame portion to be straddled by the operator's legs and adapted to be steered by a steering post having a front ski attached to the lower end thereof, said cross frame having a substantially horizontal section and an angled section extending upwardly and rearwardly from the horizontal section, the improvement comprising a detachable fuel tank resting on an upper side said horizontal section of said cross frame portion and adapted to be straddled by the legs of the operator, said fuel tank having a groove in its underside for receiving therein the upper side of said horizontal section of said frame cross portion and for holding the tank against lateral movement, a releasable forward securing means at the forward portion of the fuel tank securing the forward portion of said tank to the frame, a rearward end of said fuel tank abutted against the upwardly and rearwardly angled section and being held thereby against rearward movement, a releasable rearward securing means securing the rearward portion of the fuel tank to said frame, said forward and rearward securing means constituting a quick connect and disconnect means for assisting in quick attachment or detachment of said fuel tank to said frame cross portion, and means releasably connecting said fuel tank to a fuel line extending to the motor.

7. A snow bob in accordance with claim 6 in which said forward securing means comprises an integral retaining flanges on the forward end of said fuel tank and further comprises a mating retainer means secured to said cross portion of said frame.

8. A snow bob in accordance with claim 6 in which said tank has a groove along its rearward side for receiving said angled section of said cross frame therein.

9. In a power driven snow bob having a motor drivingly connected to an endless propulsion track carried by a rear power ski and with a frame carrying a seat at its rear end and having a cross frame portion to be straddled by the operator's legs and adapted to be steered by a steering post having a front ski attached to the lower end thereof, the improvement comprising a detachable fuel tank resting on an upper side said cross frame portion and adapted to be straddled by the legs of the operator, said fuel tank having a groove in its underside for receiving therein the upper side of said frame cross portion and for holding the tank against lateral movement, a releasable forward securing means at the forward portion of the fuel tank securing the forward portion of said tank to the frame, a releasable rearward securing means securing the rearward portion of the fuel tank to said frame, means releasably connecting said fuel tank to a fuel line extending to the motor, said cross frame portion including an angled section extending upwardly and rearwardly from a generally horizontal section and in which said rearward securing means comprises a quick connect and disconnect means located at said angled section for interlocking said fuel tank to said angled section, said quick connect and disconnect means comprising a resilient grommet having an aperture fastened to said angled section and a plunger pin for insertion into said aperture in said grommet, said fuel tank having a lip thereon with an aperture aligned with the grommet aperture to receive said plunger pin.

* * * * *